(12) United States Patent
Lee et al.

(10) Patent No.: US 12,437,951 B2
(45) Date of Patent: Oct. 7, 2025

(54) PATTERN FUSE INCLUDING OPENING AND BATTERY MODULE INCLUDING THE SAME

(71) Applicant: LG Energy Solution, Ltd., Seoul (KR)

(72) Inventors: Chang Bog Lee, Daejeon (KR); Sang Eun Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/559,659

(22) PCT Filed: Feb. 3, 2023

(86) PCT No.: PCT/KR2023/001618
§ 371 (c)(1),
(2) Date: Nov. 8, 2023

(87) PCT Pub. No.: WO2023/158140
PCT Pub. Date: Aug. 24, 2023

(65) Prior Publication Data
US 2024/0379312 A1    Nov. 14, 2024

(30) Foreign Application Priority Data

Feb. 16, 2022  (KR) .................. 10-2022-0019952

(51) Int. Cl.
*H01H 85/00*    (2006.01)
*H01H 85/046*   (2006.01)
(Continued)

(52) U.S. Cl.
CPC .... *H01H 85/0078* (2013.01); *H01H 85/0039* (2013.01); *H01H 85/046* (2013.01);
(Continued)

(58) Field of Classification Search
None
See application file for complete search history.

(56) References Cited

U.S. PATENT DOCUMENTS

2005/0141164 A1* 6/2005 Bender ............... H01H 85/046
361/104
2008/0218305 A1   9/2008 Bender et al.
(Continued)

FOREIGN PATENT DOCUMENTS

DE    102006008720 A1    8/2006
DE    102014216668 A1    3/2015
(Continued)

OTHER PUBLICATIONS

Extended European Search Report including Written Opinion for Application No. 23756553.6 dated Oct. 15, 2024, pp. 1-9.
(Continued)

*Primary Examiner* — Wyatt P McConnell
(74) *Attorney, Agent, or Firm* — Lerner David LLP (57) ABSTRACT

The present invention relates to a pattern fuse including a flame retardant coating layer and an opening, the pattern fuse being configured to prevent fire outbreak due to overcurrent generated when a circuit pattern is operated and to designate a breakage position, a flexible printed circuit board including the same, and a battery module including the same, wherein it is possible to prevent fire outbreak even when the pattern fuse is heated to a high temperature as the result of operation of the pattern fuse, and the pattern fuse is broken by fusing at a specific position thereof.

9 Claims, 5 Drawing Sheets

(51) Int. Cl.
  *H01M 10/42* (2006.01)
  *H01M 50/583* (2021.01)
(52) U.S. Cl.
  CPC ....... *H01M 10/425* (2013.01); *H01M 50/583* (2021.01); *H01M 2010/4271* (2013.01); *H01M 2200/103* (2013.01)

(56) References Cited

U.S. PATENT DOCUMENTS

| | | | |
|---|---|---|---|
| 2015/0064516 A1* | 3/2015 | Swoish | H05K 1/028 429/61 |
| 2021/0234239 A1 | 7/2021 | Kita et al. | |
| 2021/0243879 A1 | 8/2021 | Kiya et al. | |
| 2022/0085460 A1 | 3/2022 | Ellner et al. | |
| 2022/0181708 A1 | 6/2022 | Ellner et al. | |
| 2023/0420208 A1 | 12/2023 | Lee et al. | |
| 2024/0429013 A1 | 12/2024 | Lee et al. | |

FOREIGN PATENT DOCUMENTS

| | | |
|---|---|---|
| EP | 4258824 A1 | 10/2023 |
| EP | 4425527 A1 | 9/2024 |
| JP | 2006237008 A | 9/2006 |
| JP | 2017011191 A | 1/2017 |
| JP | 6453720 B2 | 1/2019 |
| JP | 2021077567 A | 5/2021 |
| JP | 2021111523 A | 8/2021 |
| JP | 2021125560 A | 8/2021 |
| KR | 20060094486 A | 8/2006 |
| KR | 20170136889 A | 12/2017 |
| KR | 20200082291 A | 7/2020 |
| KR | 20200129461 A | 11/2020 |
| KR | 20210057638 A | 5/2021 |
| KR | 20210081819 A | 7/2021 |
| KR | 20210126422 A | 10/2021 |
| KR | 20220007346 A | 1/2022 |
| WO | 2020013121 A1 | 1/2020 |
| WO | 2020198624 A1 | 10/2020 |

OTHER PUBLICATIONS

International Search Report for PCT/KR2023/001618 mailed May 4, 2023. 3 pages.
Communication pursuant to Article 94(3) EPC, for European Application No. 23756553.6, dated May 28, 25, pp. 1-6.

* cited by examiner

PATTERN FUSE INCLUDING OPENING AND BATTERY MODULE INCLUDING THE SAME

CROSS-REFERENCE TO RELATED APPLICATIONS

This application is a national phase entry under 35 U.S.C. § 371 of International Application No. PCT/KR2023/001618, filed Feb. 3, 2023, which claims the benefit of priority to Korean Patent Application No. 10-2022-0019952 filed on Feb. 16, 2022, the disclosure of which is incorporated herein by reference in its entirety.

TECHNICAL FIELD

The present invention relates to a pattern fuse including an opening and a battery module including the same, and more particularly to a pattern fuse including a flame retardant coating layer and an opening, the pattern fuse being configured to prevent fire outbreak due to overcurrent generated when a circuit pattern is operated and to designate a breakage position, a flexible printed circuit board including the same, and a battery module including the same.

BACKGROUND ART

With technological development of mobile devices, such as smartphones, laptop computers, and digital cameras, and an increase in demand of the same, research on secondary batteries, which are capable of being charged and discharged, is being actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel cadmium battery, a nickel hydride battery, and a nickel zinc battery as secondary batteries that are widely used at present. A plurality of unit secondary battery cells may be connected to each other in series or in parallel to constitute a battery module depending on required output voltage or charge and discharge capacities. In general, a battery pack is manufactured using at least one battery module by adding an additional component.

Various circuit boards, such as a protection circuit module (PCM) board capable of controlling charge and discharge of the battery cells or protecting the battery cells and a sensing board configured to sense voltage, may be applied to the battery pack, as needed.

In general, such a circuit board is provided with a fuse element configured to prevent fire outbreak or explosion of the battery pack due to overcurrent or short circuit current.

Korean Patent Application Publication No. 2020-0129461 ("Patent Document 1") discloses a battery pack having a fuse pattern having a function of blocking overcurrent or short circuit current formed on a circuit board instead of such a fuse element.

Figure 1:
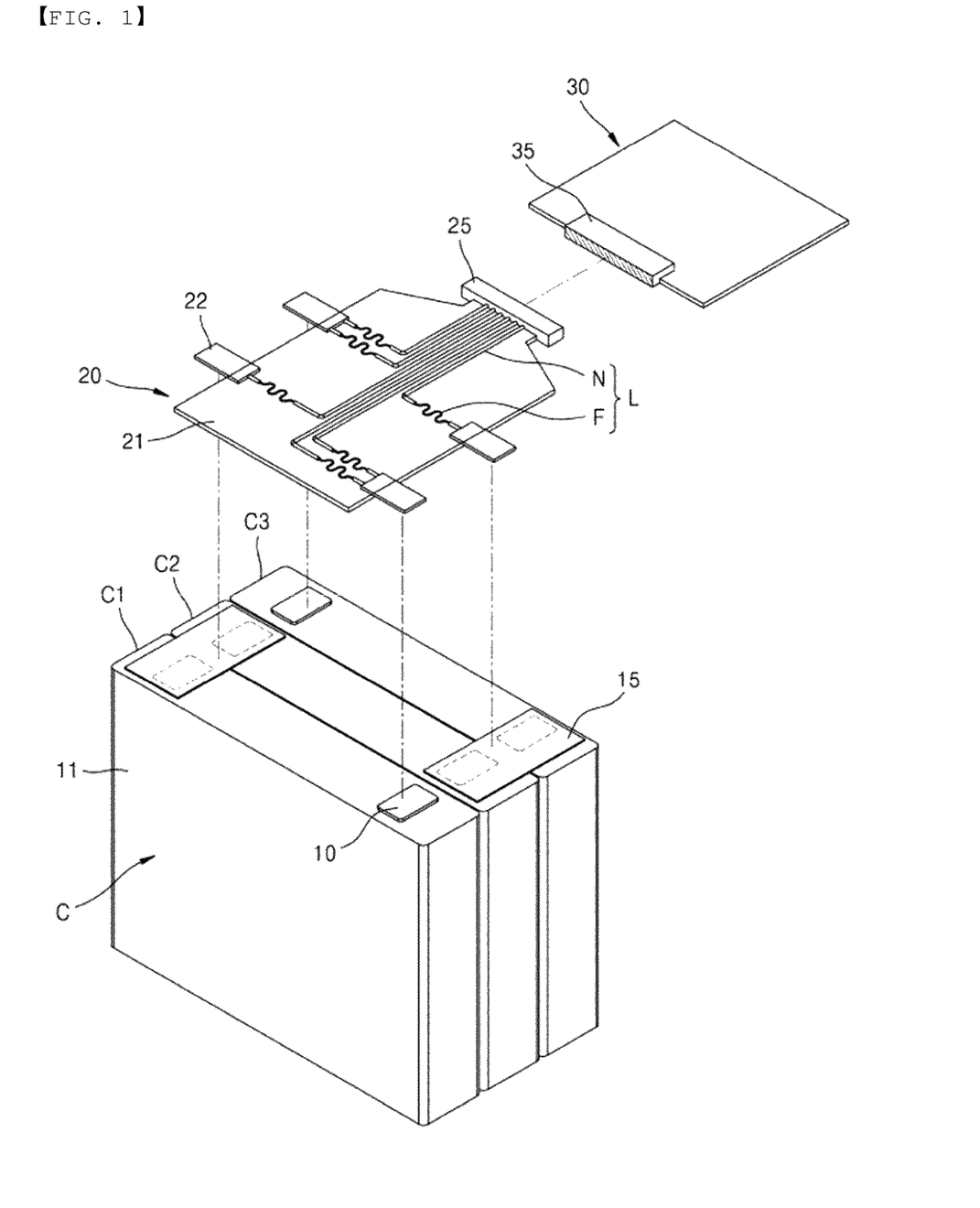
FIG. 1 is an exploded perspective view of a battery pack including a circuit board having a conventional fuse pattern formed thereon.

Referring to FIG. 1, in a battery pack including a plurality of battery cells C1, C2, and C3, a connection circuit board 20 is interposed between a main circuit board 30 and the battery cells C in order to create a connection therebetween, and the connection circuit board 20 is provided with a conductive pattern L including a fuse pattern F and a connection pattern N.

Since the fuse pattern F is located between an electrode tab 22 and the main circuit board 30, there is an advantage in that an operation of mounting a separate fuse element or a space for the fuse element is not necessary. However, the conductive pattern is generally made of a metal, such as copper, and the melting point of the metal is very high (the melting point of copper is about 1085° C.), whereby very high heat and flames may momentarily occur during operation of the fuse pattern.

A fuse element is installed in an electric circuit in order to protect functional elements installed in the electric circuit from unintended high current. When more than a predetermined level of current flows, the fuse element blocks the current in order to inhibit breakage of the functional elements. When an electric circuit is configured using a conventional printed wiring board, a board mount fuse having a lead wire is used. Such a mount fuse is mounted on the printed circuit board by soldering.

In recent years, an electric circuit using a flexible printed circuit board instead of the conventional printed wiring board has been developed, for example, in an electronic device for vehicles. In the flexible printed circuit board, wires and functional elements may be formed on a flexible film as a substrate, whereby the flexible printed circuit board is thinner than the conventional printed wiring board, and the flexible printed circuit board can be bent. When a fuse element is formed on the flexible printed circuit board, a fuse line is separated from an adhesive layer due to stress caused by vibration or heat generated during driving of a vehicle when a chip fuse is operated, for example, in an electronic device for vehicles.

When various problems occur due to short circuit or overcurrent in a printed circuit board (PCB) or a flexible printed circuit board (FPCB) having various circuit patterns implemented to sense voltage, current, temperature, etc., a pattern-shaped fuse line must be broken; however, the broken fuse line may move or the part of the fuse line to be broken cannot be predicted, whereby overcurrent is continuously generated, and therefore there is a possibility of fire outbreak due to heat generation.

Consequently, it is necessary to accurately break a specific part of a circuit line due to fusing caused by overcurrent on the flexible printed circuit board; however technological development thereof has not yet taken place, and therefore there is a need for technological development thereof.

PRIOR ART DOCUMENTS (Patent Document 1) Korean Patent Application Publication No. 2020-0129461
(Patent Document 2) Korean Patent Application Publication No. 2021-0081819
(Patent Document 3) Korean Patent Application Publication No. 2021-0057638
(Patent Document 4) Japanese Registered Patent Publication No. 6453720
(Patent Document 5) Korean Patent Application Publication No. 2017-0136889

Technical Problem

The present invention has been made in view of the above problems, and it is an object of the present invention to provide a pattern fuse including a flame retardant coating layer and an opening, the pattern fuse being configured to prevent fire outbreak due to overcurrent generated when a circuit pattern is operated and to designate a breakage position, a flexible printed circuit board including the same, and a battery module including the same.

Technical Solution

A pattern fuse according to the present invention to accomplish the above object is a pattern fuse including a first electroconductive line portion having a predetermined length configured such that current is blocked through fusing; a first film layer; and at least one opening formed in the first film layer, wherein the first electroconductive line portion is located in the at least one opening.

In addition, the pattern fuse may further include a coating layer formed on a first surface of the first film layer.

In addition, the first electroconductive line portion may include at least one shape selected from among a straight line, a curved line, a patterned shape, and an undefined shape.

In addition, the part of the first electroconductive line portion that is not located in the opening may be covered with the first film layer.

In addition, the coating layer may be formed so as to completely cover the first film layer abutting the first electroconductive line portion.

In addition, the pattern fuse may further include an adhesive layer formed on a second surface of the first film layer, the first electroconductive line portion being formed on the adhesive layer abutting the second surface, and a second film layer formed on a surface of the adhesive layer opposite the surface of the adhesive layer on which the first electroconductive line portion is formed.

In addition, adhesion between the first electroconductive line portion and the adhesive layer may be greater than adhesion between the first electroconductive line portion and the coating layer.

In addition, the melting point of the coating layer may be higher than the melting point of the first film layer, and thermal conductivity of the coating layer may be lower than thermal conductivity of the first film layer.

In addition, the ratio ($A_{EC}/A_{OP}$) of the area ($A_{EC}$) Of the first electroconductive line portion located in the opening to the area ($A_{OP}$) of the opening may be 1 to 0.01.

In addition, the opening may have at least one shape selected from among a circle, a triangle, a quadrangle, a polygon, and an undefined shape.

In addition, the present invention provides flexible printed circuit board including the pattern fuse.

A battery module according to the present invention to accomplish the above object is a battery module including a battery cell, a battery management system (BMS) configured to monitor voltage, current, and temperature of the battery cell, and a flexible printed circuit board connected to the battery cell and the BMS, wherein the flexible printed circuit board includes a pattern fuse including a first electroconductive portion having a predetermined length configured such that current is blocked through fusing, the first electroconductive line portion being located in at least one opening formed in a first film layer.

In addition, the present invention provides a device including the battery module.

In addition, the device may be an electric vehicle (EV), a hybrid electric vehicle (HEV), or a plug-in hybrid electric vehicle (PHEV).

Advantageous Effects

A pattern fuse according to the present invention has a flame retardant coating layer, whereby it is possible to prevent arcs or sparks (flames) generated when the pattern fuse is operated from being discharged to the outside.

In addition, the present invention has a merit in that a circuit board has the pattern fuse according to the present invention, whereby it is possible to have the function of a fuse without a separate process of mounting a fuse element.

In addition, the present invention has an effect in that a flexible printed circuit board including the pattern fuse according to the present invention is configured such that the pattern fuse is broken by fusing at a specific position of the pattern fuse, whereby heat concentration is achieved, and therefore it is possible to induce breakage in as short a time as possible.

In addition, the present invention has an effect in that the flexible printed circuit board including the pattern fuse according to the present invention is configured such that overheating or fire outbreak is prevented in other regions of the flexible printed circuit board.

In addition, the present invention has an effect in that the flexible printed circuit board including the pattern fuse according to the present invention is configured such that breakage of a specific region is induced, whereby reproducibility of breakage operation is secured, and therefore it is possible to prevent the occurrence of short circuit due to unexpected movement of the broken fuse line as the result of melting of an adhesive layer.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pattern fuse according to the present invention will be described with reference to the accompanying drawings.

Figure 2:
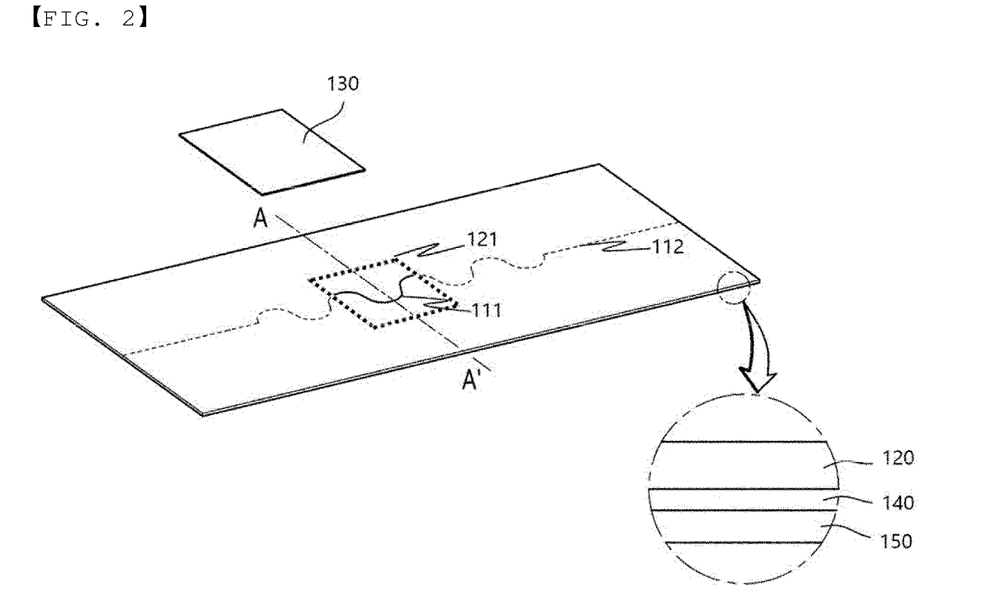
FIG. 2 is an exploded perspective view schematically showing a pattern fuse according to an embodiment of the present invention.

FIG. 2 is an exploded perspective view schematically showing a pattern fuse according to an embodiment of the present invention.

Figure 3:
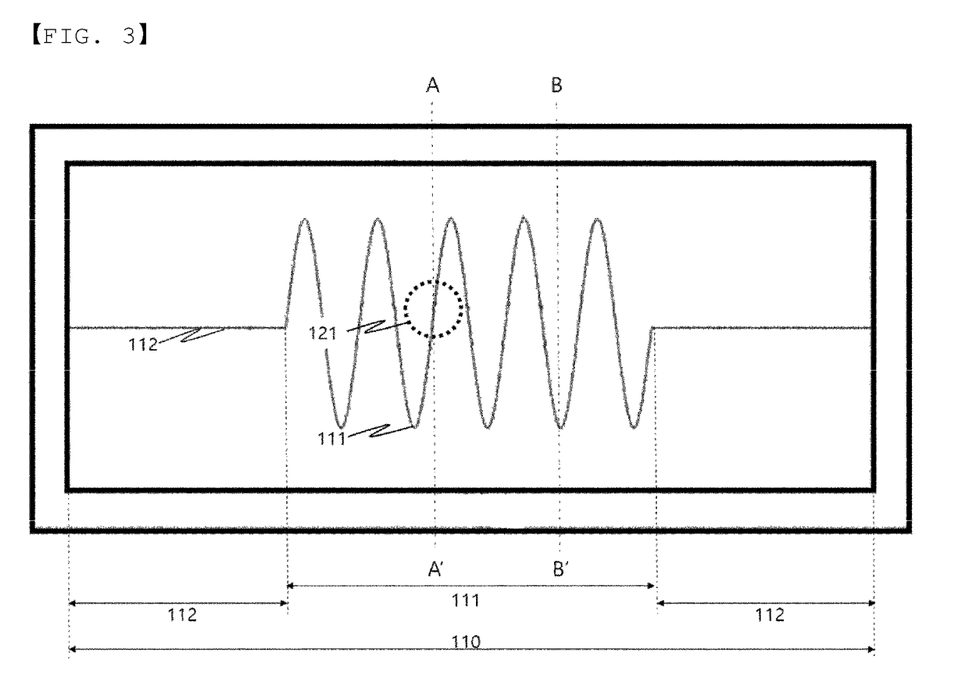
FIG. 3 is an exploded perspective view schematically showing an opening formed in the pattern fuse according to the embodiment of the present invention.
Figure 4:
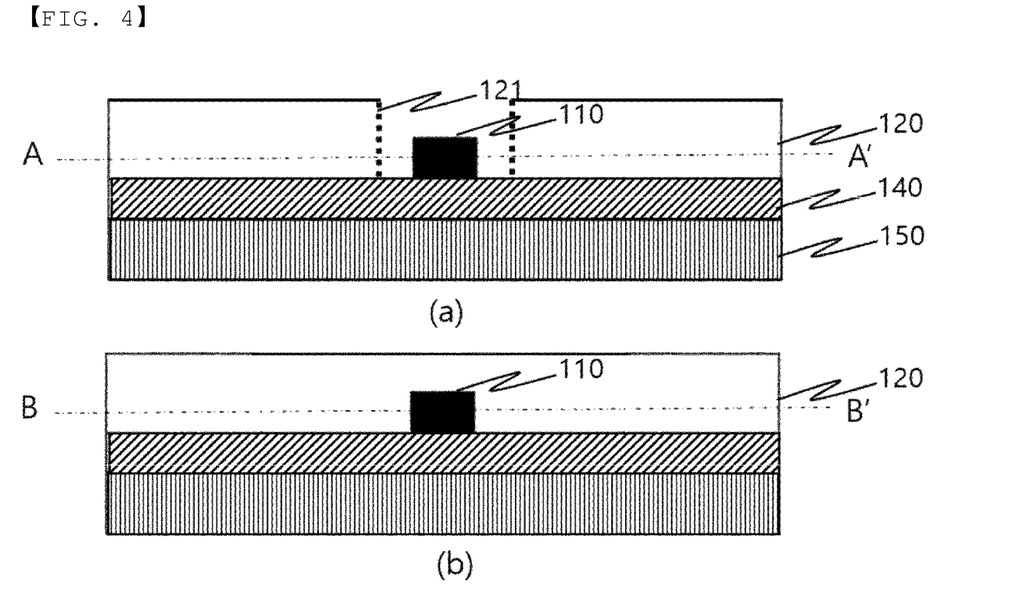
FIG. 4 is (a) a sectional view taken along line A-A' of FIG. 3 and (b) a sectional view taken along line B-B' of FIG. 3.

When describing the pattern fuse 100 according to the present invention with reference to FIGS. 2 to 4, the pattern fuse 100 may include a second film layer 150, an adhesive layer 140, an electroconductive line 110, a first film layer 120, and a coating layer 130.

The electroconductive line 110 may be constituted by a first electroconductive line portion 111 and a second electroconductive line portion 112. In general, the first electroconductive line portion 111 is fused.

As long as the electroconductive line 110 is made of an electrically conductive material, the material is not restricted. Preferably, the electroconductive line is constituted by any one of electro-deposited (ED) foil and rolled annealed (RA) foil. Preferably, the electroconductive line is rolled annealed copper foil. The rolled annealed copper foil exhibits excellent bending resistance and high density, whereby the rolled annealed copper foil may be good for a moving part, although it is difficult to produce the rolled annealed copper foil.

First, the second film layer 150, which is a layer that serves to insulate the electroconductive line 110, which is conductive, from the outside, may be made of any of various known insulative polymer materials.

In particular, polyimide (PI), polyethylene naphthalate (PEN), and polyethylene terephthalate (PET), each of which exhibits excellent thermal characteristics, are preferably used as the material for the second film layer 150. Thereamong, polyimide (PI) is most preferably used in terms of thermal characteristics.

The adhesive layer 140, which is located on the second film layer 150, is a layer configured to allow the electroconductive line 110 to be attached to the second film layer 150 therethrough. The material for the adhesive layer is not particularly restricted as long as the electroconductive line 110 can be adhered thereto.

Here, the electroconductive line 110 is fixed to the top of the second film layer 150 via the adhesive layer 140; however, a part of the electroconductive line 110 may be slightly depressed in the adhesive layer 140.

The electroconductive line 110 is designed so as to be advantageous in generation of heat using a conductive material, such as copper. The electroconductive line may be formed so as to have any of various known shapes as well as a wave form shown in FIG. 2.

In addition, the electroconductive line 110 may be made of the same material as lead wires (not shown) connected to opposite sides of the electroconductive line 110 or may be made of a material that is different in kind from the material for the opposite lead wires and that has a melting point lower than the melting point of the opposite lead wires. The thicknesses of the electroconductive line 110 and the opposite lead wires and the length of the electroconductive line 110 may be appropriately designed depending on operating conditions of the pattern fuse 100.

Next, the first film layer 120 will be described. The first film layer 120 performs a function of insulation from the outside, in the same manner as the second film layer 150 described above. Consequently, the first film layer may be made of the same material as the second film layer 150; however, the present invention is not limited thereto, and the first film layer may be made of any of various insulative polymer materials.

Meanwhile, as shown in FIG. 2, an opening 121 is formed in a central part of the first film layer 120 such that a part of the electroconductive line 110, more specifically a part or the entirety of the first electroconductive line portion 111, is exposed.

The opening 121 is covered with the coating layer 130. The coating layer 130 is a layer configured to prevent fire outbreak due to heat or flames generated from the electroconductive line 110.

When the pattern fuse is operated, the temperature of the pattern fuse increases to such an extent that the material constituting the electroconductive line 110 can be melted, as previously described. In general, the film layer that covers the circuit pattern exhibits low flame retardancy, and therefore fire frequently breaks out.

Of course, it is possible for the film layer that covers the circuit pattern to be made of a material that exhibits high flame retardancy. Since even a part having no circuit pattern must be provided, however, there is a cost increase problem.

Here, it is preferable for a flame retardant composition that is electrically insulative and has class V-0 based on the UL94 V test, which is one of the flame retardancy tests for plastic materials, to be used as the flame retardant material for the coating layer.

The UL94 V test is a test that evaluates the combustion pattern of a plastic product and the degree of spread of flames to the surroundings of the product when the flames are applied to the product in a vertical direction. Classes V-0, V-1, and V-2 are set based on combustion time. Thereamong, class V-0 is a class having the highest flame retardancy.

Here, the flame retardant composition means a composition formed by adding a flame retardant and various additives to a polymer resin composition in order to improve flame retardancy.

There are various known materials, such as polyurethane, urethane, epoxy, and acrylic, as polymer resins that can become a flame retardant composition.

In particular, heat is generated from the electroconductive line 110. The lower the endothermicity and thermal conductivity of the coating layer 130 that covers the electroconductive line 110, the earlier the electroconductive line 110 is broken, whereby it is possible to block overcurrent early.

Among various polymer resins, therefore, a composition mainly including a urethane-based material, a polyurethane-based material, or a mixture of polyurethane and polyacrylic, which exhibits relatively low endothermicity and thermal conductivity, may be appropriately used.

The characteristics of the polymer resin may be changed depending on the percentages or physical properties of ingredients, and it is obvious that a resin may be selectively applied depending on actual endothermicity and thermal conductivity thereof when the resin is selected. As an example, the resin may have a thermal conductivity of, preferably, 0.10 W/mk or less, more preferably 0.05 W/mk or less.

If the thermal conductivity deviates from the above range, the function of the coating layer may not be properly performed.

Of course, it is obvious that various additives that are generally used may be included in the flame retardant composition used to form the flame retardant coating layer.

In addition, an inorganic-based filler capable of improving flame retardancy, such as glass fiber or spherical silica, may be added alone or in an mixed state.

Meanwhile, if the area of the coating layer 130 is less than the area of the opening 121, it is not possible to completely block the electroconductive line 110 under the coating layer from the outside. Consequently, it is preferable for the area of the coating layer to be equal to the area of the opening 121 so as to cover only the opening 121, and it is more preferable for the area of the coating layer to be slightly greater than the area of the opening 121 so as to partially overlap an edge of the opening 121 including the opening 121.

In addition, the ratio ($A_{EC}/A_{OP}$) of the area $A_{EC}$ of the first electroconductive line portion located in the opening to the area $A_{OP}$ of the opening may be 1 to 0.01, preferably 1 to 0.5, more preferably 1 to 0.8. If the ratio deviates from the above range, a breakage function due to fusing in the opening may not be properly implemented.

Next, a method of manufacturing a pattern fuse according to the present invention will be described.

FIG. 3 is an exploded perspective view schematically showing an opening formed in the pattern fuse according to the embodiment of the present invention.

A first electroconductive line portion having a predetermined length configured such that current is blocked due to fusing may be a pattern fuse located in at least one opening formed in the first film layer.

It is obvious that the predetermined length of the first electroconductive line portion may be changed depending on the fuse current rating to be implemented. When fuse current rating is low, the length may be increased in order to increase resistance, or the width may be decreased in order to increase resistance. When fuse current rating is high, the length may be decreased in order to decrease resistance, or the width may be increased in order to decrease resistance.

As an embodiment, the length may be 50 mm in order to implement low current rating, and if the length deviates from the above value, fusing may not effectively occur.

The predetermined length may be about 0.01 µm to 500 mm.

Figure 10:
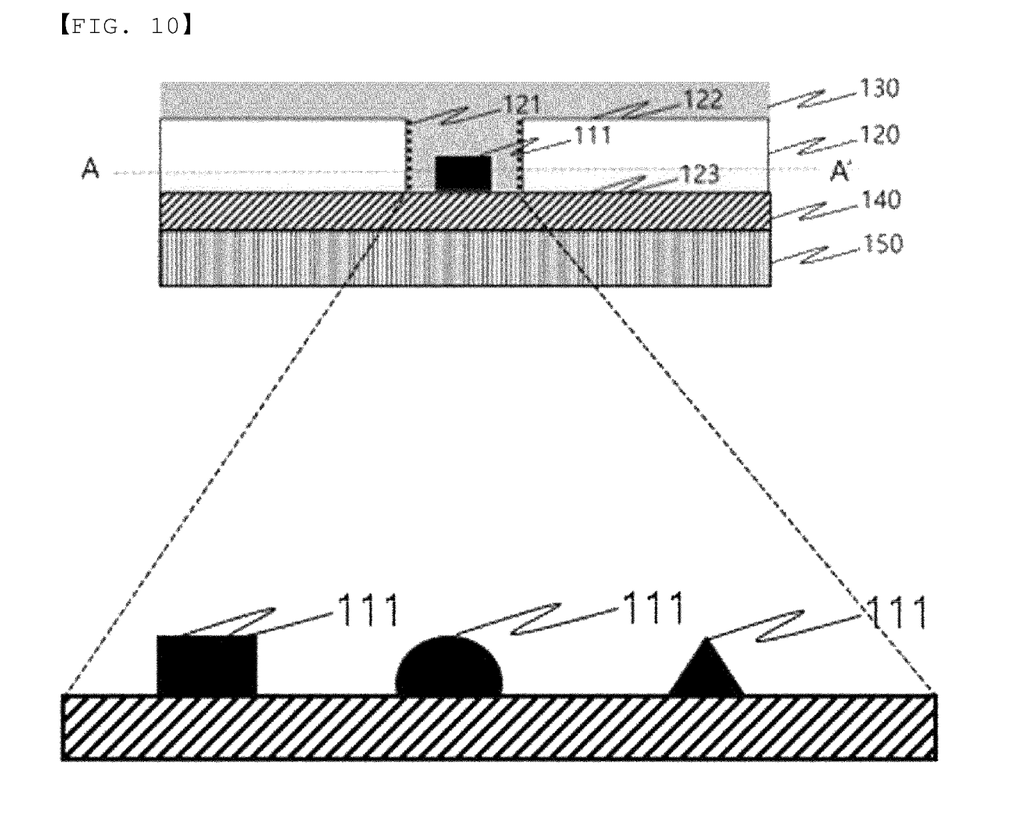
FIG. 10 is a conceptual view of the first electroconductive line portion based on the shape of the width thereof.

As an embodiment, in order to implement low current rating, the sectional area of the first electroconductive line portion defining the width thereof may be uniform over the entire region of the first electroconductive line portion in which the pattern fuse is implemented, and the width of a specific part of the first electroconductive line portion may be increased or decreased. It is obvious that the width of the first electroconductive line portion may be changed depending on fuse current rating necessary for fusing to occur at a predetermined position of the first electroconductive line portion under predetermined conditions.

As an embodiment, it is obvious that the section of the width may have at least one shape selected from among a quadrangle, a circle, a triangle, and an undefined shape.

The first film layer may be made of any one selected from among polyimide (PI), polyethylene naphthalate (PEN), and polyethylene terephthalate (PET). As an embodiment, in selecting the material for the first film layer, the characteristics of the material may be changed depending on the percentages or physical properties of ingredients, and it is obvious that a resin may be selectively applied depending on actual endothermicity and thermal conductivity thereof when the resin is selected.

FIG. 4 is (a) a sectional view taken along line A-A' of FIG. 3 and (b) a sectional view taken along line B-B' of FIG. 3.

The first electroconductive line portion may include at least one shape selected from among a straight line, a curved line, a patterned shape, and an undefined shape.

The shape or form of the first electroconductive line portion is not restricted as long as the length of the first electroconductive line portion formed per unit area is sufficient to provide the resistance value for breakage characteristics (applied current, breakage time, etc.) to be implemented.

It is not necessarily good to increase the resistance, and the resistance may be decreased or increased depending on the breakage characteristics to be implemented.

The electroconductive line portion may be made of copper foil that constitutes a circuit. Preferably, the electroconductive line portion is made of rolled annealed foil or electro-deposited foil.

The electroconductive line portion may be made of an electroconductive line.

The electroconductive line portion may be constituted by a second electroconductive line portion configured to form a current flow through energization of a circuit and a first electroconductive line portion configured to be fused by heat generated due to an increase in resistance on the circuit when overcurrent is generated such that the circuit is broken, whereby current is blocked.

Figure 5:
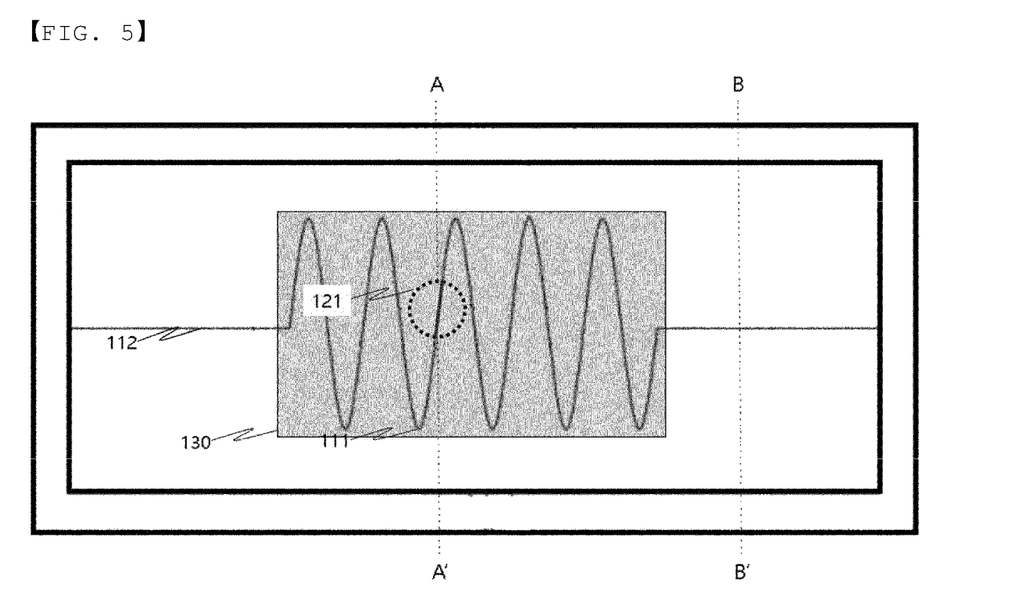
FIG. 5 is an exploded perspective view schematically showing a coating layer and an opening formed at the pattern fuse according to the embodiment of the present invention.

FIG. 5 is an exploded perspective view schematically showing a coating layer and an opening formed at the pattern fuse according to the embodiment of the present invention.

The pattern fuse may include a coating layer formed on a first surface of the first film layer.

The coating layer may be formed by applying a flame retardant composition to the opening and hardening the flame retardant composition.

The coating layer may be a film, made of a flame retardant composition, provided in the opening, and may hermetically seal the opening.

The coating layer may be made of a flame retardant material.

The flame retardant composition may be a flame retardant composition having class V-0 based on the UL94 standards.

The flame retardant composition may be a polyurethane-based or urethane-based composition. Preferably, the flame retardant composition includes an inorganic-based filler, and the inorganic-based filler may be at least one of glass fiber and spherical silica. It is obvious that, when a polyurethane-based or polyacrylic-based coating agent is applied, the flame retardant composition may be variously selected depending on change of the coating agent, the shape of the coating layer, and applied conditions as an embodiment.

Thermal conductivity of the coating layer may be lower than thermal conductivity of the first film layer.

Figure 6:
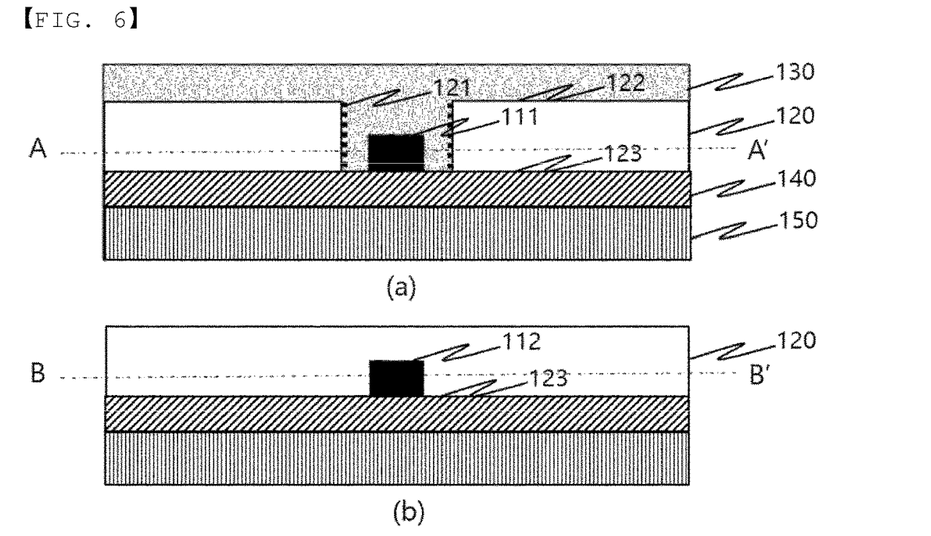
FIG. 6 is (a) a sectional view taken along line A-A' of FIG. 5 and (b) a sectional view taken along line B-B' of FIG. 5.

FIG. 6 is (a) a sectional view taken along line A-A' of FIG. 5 and (b) a sectional view taken along line B-B' of FIG. 5.

The part of the first electroconductive line portion that is not located in the opening may be covered with the first film layer.

The coating layer may be formed so as to completely cover the first film layer abutting the first electroconductive line portion.

The pattern fuse may include an adhesive layer formed on a second surface of the first film layer, the first electroconductive line portion being formed on the adhesive layer abutting the second surface, and a second film layer formed on a surface of the adhesive layer opposite the surface of the adhesive layer on which the first electroconductive line portion is formed.

Adhesion between the first electroconductive line portion and the adhesive layer may be greater than adhesion between the first electroconductive line portion and the coating layer.

Adhesion between the first electroconductive line portion and the adhesive layer may be less than adhesion between the first electroconductive line portion and the coating layer.

If adhesion between the first electroconductive line portion and the adhesive layer is greater than adhesion between the first electroconductive line portion and the coating layer, a space may be generated between the first electroconductive line portion and the coating layer when gas is generated between the first film layer and the adhesive layer as a result of evaporation of the first electroconductive line portion due to overheating thereof.

The first electroconductive line portion, the adhesive layer, and the second film layer may be defined as a lower part of the pattern fuse of the flexible printed circuit board.

The first electroconductive line portion, the first film layer including the opening, and the coating layer may be defined as an upper part of the pattern fuse of the flexible printed circuit board.

When the first electroconductive line portion, which is formed so as to have the pattern shape, is evaporated due to overheating thereof, whereby gas is generated, a space may be generated in the upper part of the pattern fuse, rather than in the lower part of the pattern fuse, due to the difference in adhesion.

The melting point of the coating layer may be higher than the melting point of the first film layer, and the thermal conductivity of the coating layer may be lower than the thermal conductivity of the first film layer.

The melting point of the coating layer may be higher than the melting point of the first film layer, and the thermal conductivity of the coating layer may not be lower than the thermal conductivity of the first film layer.

It is obvious that the melting point and the thermal conductivity of the coating layer may be changed depending on the material for the coating layer, formation conditions of the coating layer, and material selection based on operating conditions of the pattern fuse.

Figure 7:
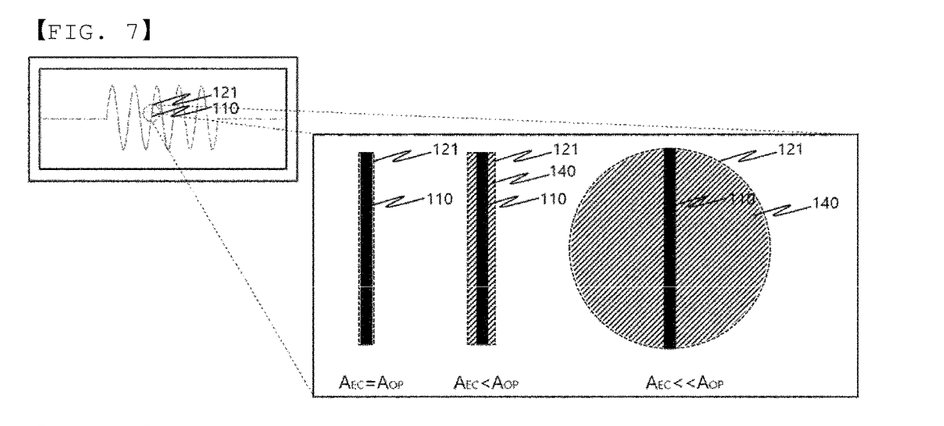
FIG. 7 is a conceptual view of the opening and a first electroconductive line portion based on the shape and area thereof.

FIG. 7 is a conceptual view of the opening and the first electroconductive line portion based on the shape and area thereof.

The area $A_{OP}$ of the opening may be equal to or greater than the area $A_{EC}$ of the first electroconductive line portion located in the opening.

The present invention may provide a flexible printed circuit board including the pattern fuse.

The flexible printed circuit board may be any one of a single-sided flexible printed circuit board including a cover layer constituted by a film layer and an adhesive layer and a copper clad laminate (CCL) constituted by an electroconductive metal line and a film layer, a double-sided flexible printed circuit board including two cover layers and one copper clad laminate, a multilayered flexible printed circuit board including three or more cover layers and a copper clad laminate, a double-access type flexible printed circuit board including two cover layers and an electroconductive metal line, a rigid type flexible printed circuit board, and a buildup type flexible printed circuit board.

Example

In this experiment, 500% of current rating was applied to experiment fusing of a pattern fuse. The fuse current rating was 1 A, and test current was 5 A.

Figure 8:
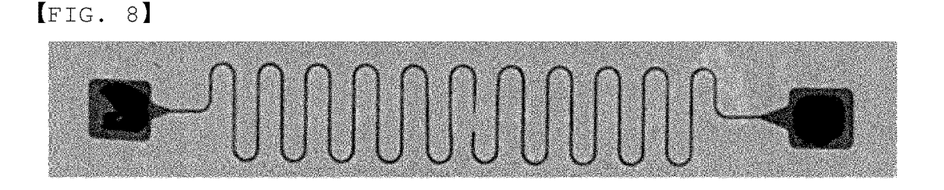
FIG. 8 is an X-ray photograph showing breakage of a first electroconductive line portion in an opening according to fusing according to an embodiment of the present invention.

FIG. 8 is an X-ray photograph showing breakage of a first electroconductive line portion in an opening according to fusing according to an embodiment of the present invention.

The verification result of operability of the pattern fuse according to the present: invention based on the structure thereof revealed that, when the pattern fuse was broken, there was no movement of the pattern, and broken parts of all samples were located in the opening.

It can be seen therefrom that heat was most rapidly accumulated in the opening due to the structure thereof and that reliability in breakage of the pattern fuse was secured as the result of securing reproducibility.

Comparative Example

This experiment was identical in experimental conditions to the above example, and the experiment was performed under the same conditions except that the experiment was performed on a pattern fuse that was not provided with a first film layer having an opening according to the present invention.

Figure 9:
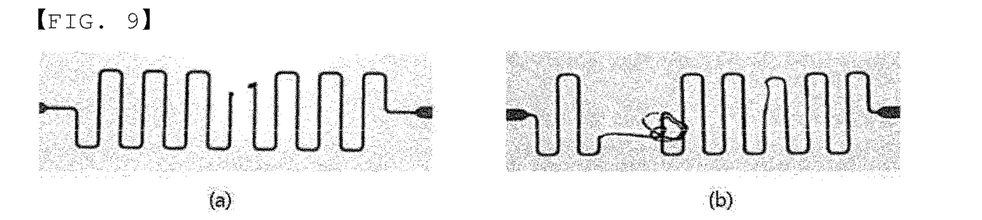
FIG. 9 is an X-ray photograph showing breakage of a first electroconductive line portion without an opening (a) and short circuit after breakage of the first electroconductive line portion (b) as a comparative example.

FIG. 9 is an X-ray photograph showing breakage of a first electroconductive line portion without an opening (a) and short circuit after breakage of the first electroconductive line portion (b) as a comparative example.

Analysis of Experiment Result

It can be seen from the result of the comparative example that, in a conventional pattern fuse structure, in which a pattern fuse copper foil and a film layer is formed, a part of the pattern fuse may be appropriately broken, as shown in (a) of FIG. 9, but there is a risk of short circuit and unsecured insulation resistance due to movement of the pattern after breakage, as shown in (b) of FIG. 9.

Also, it can be seen that the broken part of the pattern fuse is randomly formed, as shown in (a) of FIG. 9, whereby it is difficult to secure positional reproducibility of the broken region.

Referring to FIGS. 2 to 6, the method of manufacturing the pattern fuse 100 includes a first step of preparing a second film layer 150, a second step of forming an adhesive layer 140 on the second film layer 150, a third step of seating an electroconductive line 110 on the adhesive layer 140, a fourth step of stacking a first film layer 120 provided with an opening 121, and a fifth step of forming a coating layer 130.

Meanwhile, the electroconductive line 110 may be formed by seating a pattern prepared in advance so as to have a desired shape on the adhesive layer 140 or by directly forming a desired shape on the adhesive layer 140.

Also, in the fourth step of stacking the first film layer 120, it is more preferable to stack the first film layer 120 having the opening 121 formed therein in advance although the first film layer 120 may be stacked on the adhesive layer 140 in the state in which the electroconductive line 110 is seated and then a region corresponding to the opening 121 may be removed such that a part or the entirety of the electroconductive line 110 is exposed.

Also, in the fifth step of forming the coating layer 130 in the opening 121, a flame retardant composition may be applied to the opening 212 and hardened to form the coating layer 130, or a thin film type coating layer 130 may be prepared in advance and may then be stacked so as to cover the opening 211.

The pattern fuse 100 may be formed at a predetermined position on a circuit board, such as a printed circuit board (PCB) or a flexible PCB (FPCB), through the above process, and may be applied to various devices, such as a battery pack.

Of course, when the pattern fuse 100 is formed on the circuit board, the electroconductive line 110 may be directly formed on the board without forming a part or the entirety of the second film layer 150 or the adhesive layer 140 depending on circumstances.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Pattern fuse
110: Electroconductive line
111: First electroconductive line portion
112: Second electroconductive line portion
120: First film layer
121: Opening
122: First surface
123: Second surface
130: Coating layer
140: Adhesive layer
150: Second film layer

The invention claimed is:

1. A pattern fuse comprising:
a first electroconductive line portion having a predetermined length configured to block current to inhibit breakage of functional elements;
a first film layer;
at least one opening formed in the first film layer, wherein the first electroconductive line portion is located in the at least one opening;
a flame retardant coating layer formed on a first surface of the first film layer;
an adhesive layer formed on a second surface of the first film layer, the first electroconductive line portion being formed on the adhesive layer abutting the second surface; and
a second film layer formed on a surface of the adhesive layer opposite a surface of the adhesive layer on which the first electroconductive line portion is formed,
wherein adhesion between the first electroconductive line portion and the adhesive layer is greater than adhesion between the first electroconductive line portion and the coating layer,
wherein a melting point of the coating layer is higher than a melting portion of the first film layer, and a thermal conductivity of the coating layer is lower than a thermal conductivity of the first film layer, and
wherein the thermal conductivity of the coating layer is 0.10 W/mk or less.

2. The pattern fuse according to claim 1, wherein the first electroconductive line portion comprises at least one shape selected from among a straight line, a curved line, a patterned shape, and an undefined shape.

3. The pattern fuse according to claim 1, wherein a part of the first electroconductive line portion that is not located in the opening is covered with the first film layer.

4. The pattern fuse according to claim 1, wherein the coating layer is formed so as to completely cover the first film layer abutting the first electroconductive line portion.

5. The pattern fuse according to claim 1, wherein a ratio of an area of the first electroconductive line portion located in the opening to an area of the opening is 1 to 0.01.

6. The pattern fuse according to claim 1, wherein the opening has a shape selected from among a circle, a triangle, a quadrangle, a polygon, and an undefined shape.

7. A flexible printed circuit board comprising the pattern fuse according to claim 1.

8. A battery module comprising:
a battery cell;
a battery management system configured to monitor voltage, current, and temperature of the battery cell; and
a flexible printed circuit board connected to the battery cell and the battery management system, wherein
the flexible printed circuit board comprises a pattern fuse comprising:
a first electroconductive line portion having a predetermined length configured to block current to inhibit breakage of function elements, the first electroconductive line portion being aligned with at least one opening formed in a first film layer;
a flame retardant coating layer formed on a first surface of the first film layer;
an adhesive layer formed on a second surface of the first film layer, the first electroconductive line portion being formed on the adhesive layer abutting the second surface; and
a second film layer formed on a surface of the adhesive layer opposite a surface of the adhesive layer on which the first electroconductive line portion is formed,
wherein adhesion between the first electroconductive line portion and the adhesive layer is greater than adhesion between the first electroconductive line portion and the coating layer,
wherein a melting point of the coating layer is higher than a melting point of the first film layer, and a thermal conductivity of the coating layer is lower than a thermal conductivity of the first film layer, and
wherein the thermal conductivity of the coating layer is 0.10 W/mk or less.

9. A device comprising the battery module according to claim 8.

* * * * *